United States Patent
Farneth

[15] 3,636,554
[45] Jan. 18, 1972

[54] SYNCHRO-TO-DIGITAL CONVERTER
[72] Inventor: William N. Farneth, Cato, N.Y.
[73] Assignee: The United States of America as represented by the Secretary of the Navy
[22] Filed: May 13, 1970
[21] Appl. No.: 36,829

[52] U.S. Cl. ...................................340/347 SY
[51] Int. Cl. .......................................H03k 13/02
[58] Field of Search..............................340/347 AP, 347 SY

[56] References Cited

UNITED STATES PATENTS

| | | |
|---|---|---|
| 3,509,559 | 4/1970 | Leconte..................................340/347 |
| 3,505,669 | 4/1970 | Welch....................................340/347 |
| 3,508,252 | 4/1970 | Van Blarcom..........................340/347 |
| 3,482,242 | 12/1969 | Hargrove...........................340/347 SY |

Primary Examiner—Maynard R. Wilbur
Assistant Examiner—Jeremiah Glassman
Attorney—R. S. Sciascia and H. H. Losche

[57] ABSTRACT

A synchro rotor position-to-digital number converting means having a transformer to transform the three phases of the synchro into a sine phase and a cosine phase 90° apart, summing these phases into an analog voltage representative of the resultant angle, and a binary counter coupled to be started in count from the synchro reference voltage or a clock synchronizing frequency and coupled to be stopped in counting by the summed analog voltage in accordance with the three-phase synchro input rotor angular position.

6 Claims, 3 Drawing Figures

INVENTOR.
WILLIAM N. FARNETH
BY H. H. Locke
ATTORNEY 3,636,554

SYNCHRO-TO-DIGITAL CONVERTER

BACKGROUND OF THE INVENTION

This invention relates to means of converting synchro rotor angular position to a digital number representative of that position and more particularly to the obtaining of an accurate digital readout of rotor position based on the angle of the rotating field produced by the three phases of the synchro.

It is often necessary to convert the rotor position of a synchro in a servomechanism into an indicated readout and a digital readout is preferable for accuracy and storage in a register. While the first known types of converters of these angles were mechanical and electromechanical, better service devices were entirely electrical. Complete electrical converters are known that use the three synchro input voltages and convert these by a Scott transformer into sine and cosine voltages. Analog voltages are then used as representative of shaft or rotor angle. Later the analog voltages were converted to digital readout by analog-to-digital (A-D) converters. One of the problems encountered in such conversions is to establish a proper reference voltage or pulse system to attain accuracy.

SUMMARY OF THE INVENTION

In the present invention a Scott transformer is used to transform the three phases of voltages into sine and cosine voltages, the amplitudes and polarity of which produce a north-south pole position electrically throughout 360°. Since the sine voltage and the cosine voltage are in the time phase, they cannot be added. Thus, one of these voltages is passed through a 90° phase shifter and the sine and cosine voltages added to generate a resultant analog voltage representative of the angular rotor position. The voltage used to supply the synchro system is used as a reference voltage to the resultant analog voltage. A digital counter is triggered to start count of the reference voltage or a clock frequency at the zero crossover point and the counter is triggered to stop the count at the zero crossover point of the resultant summed analog voltage providing a digit count representative of the rotor position of the synchro throughout 360°. In a modification of this converter a clock frequency can be used to modulate the sine and cosine voltages as well as to drive the digital counter thereby making the converter insensitive to synchro driving or reference voltage frequency. It is accordingly a general object of this invention to provide a digital readout of the rotor position of a synchro transmitter-receiver system by obtaining an accurate linear phase shift between the reference voltage and the voltage generated from the outputs of the synchro and converting this phase shift to a digital number representative of the synchro rotor angle.

BRIEF DESCRIPTION OF THE DRAWINGS

These and other objects and the attendant advantages, features, and uses will become more apparent to those skilled in the art as a more detailed description proceeds when considered along with the accompanying drawings, in which.

DESCRIPTION OF THE PREFERRED EMBODIMENT

Figure 1:
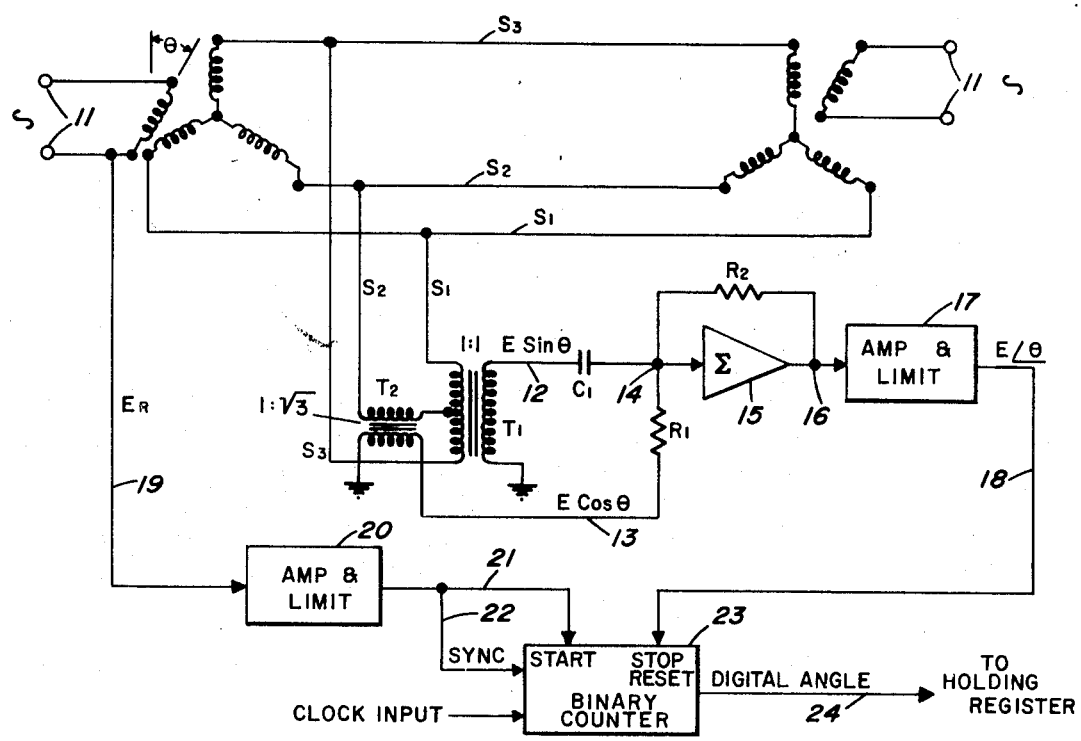
FIG. 1 is a block and circuit schematic of the synchro to digital converter shown in the environment of the synchronous system.

Referring more particularly to FIG. 1 there is illustrated a block circuit schematic of a synchro transmitter and receiver system having a supply of alternating-current (AC) voltage applied to terminals 11 of the rotors, transmitter, and receiver and showing the usual three transmission conductors of the standard synchro S1, S2, and S3. As is well understood by those skilled in the art, the output voltages from the transmission leads S1, S2, and S3 are:

$S3-S1 = E \sin \theta$
$S2-S3 = E \sin (\theta + 120°)$
$S1-S2 = E \sin (\theta - 120°)$ In these equations $\theta$ is equal to the synchro rotor angle while $E$ is the AC carrier voltage. The values of voltages across lines S3–S1, S2–S3, and S1–S2 are resolved into sine and cosine functions of the angle $\theta$ by coupling S1 and S3 across the primary of a transformer $T_1$ and the conductor S2 through the primary of a transformer $T_2$ to a center tap on the primary of $T_1$. The primary and secondary of the transformer $T_1$ have a 1:1 ratio while the windings of transformer $T_2$ have a ratio $1:\sqrt{3}$. The output of the secondary of transformer $T_1$ is by way of conductor 12 through a capacitor $C_1$ to the terminal 14 while the secondary output of transformer $T_2$ is by way of conductor 13 through a resistor $R_1$ to the terminal 14. The output 13 conducts the voltage function $E \cos \theta$, the transformers $T_1$ and $T_2$ constituting a Scott transformer producing the sine and cosine functions from the three voltage functions on the inputs S1, S2, and S3. The $E \sin \theta$ and $E \cos \theta$ outputs may be considered as the legs of a right triangle which are equivalent in time phase on the outputs 12 and 13. Since these voltages $E \sin \theta$ and $E \cos \theta$ are in time phase at the Scott transformer outputs, they cannot be added in quadrature and, accordingly, the capacitor $C_1$ and resistor $R_1$ produce a 90° phase shift in the current corresponding to $E \sin \theta$ voltages so that these voltages effectively may be added in quadrature. The two voltages are added in the summing amplifier 15 from the terminal input 14 to the output 1 which summed voltage is fed back through the feedback resistor $R_2$ to terminal 14. The added voltages at terminal 16 produce the sum voltage $E(\cos \theta + j \sin \theta)$ which is equal to the phasor voltage $E_7 \theta$ that is shifted in time phase from the reference voltage $E_R$ applied to the terminals 11 of the synchro system. This reference voltage $E_R$ is conducted over the conductor means 19 through a limiter and amplifier circuit 20 on an output over branch circuits 21 and 22 to a binary counter circuit 23. The output 16 of the phasor voltage $E_7 \theta$ is applied through an amplifier and limiter circuit 17 over an output conductor 18 to the reset terminal of the binary counter 23. The output 21 of the amplifier and limiter 20 is coupled to the start terminal of the binary counter while the branch conductor 22 is coupled as the sync or synchronous input to the binary counter to count the positive voltage swings of the reference voltage $E_R$. For each positive voltage swing of the reference voltage $E_R$ the start terminal is energized and the positive pulses of the voltage $E_R$ are counted until a summed voltage positive swing is applied to the reset terminal over the conductor means 18 to stop the digital counter. The output of the digital counter providing the count is conducted over the line 24 to any indicator or point of use such as to a holding register.

OPERATION OF FIG. 1

Figure 2:
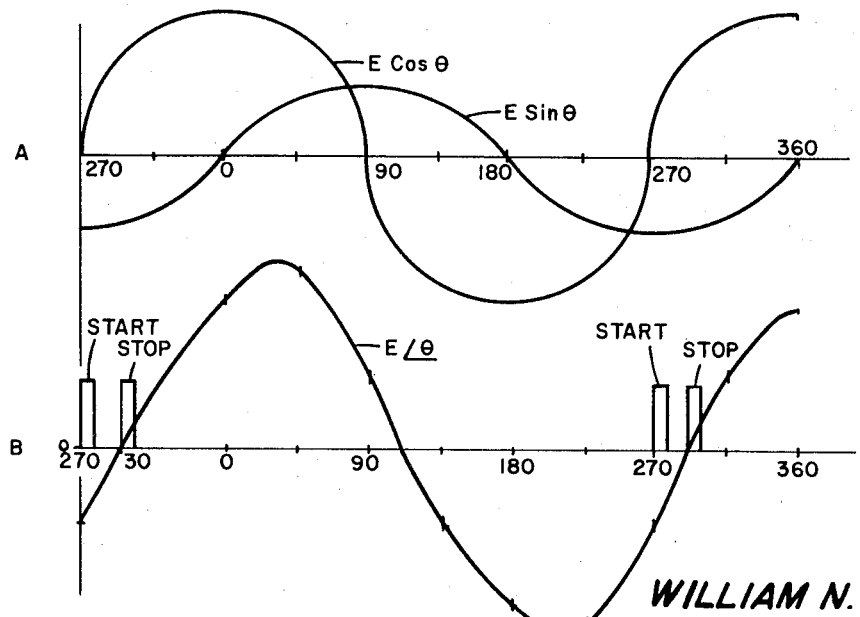
FIG. 2 illustrates waveforms produced in the circuit of FIG. 1.

In the operation of the system shown in FIG. 1 let it be assumed for one condition of the rotor, as shown at the angle $\theta$, to have the sine and cosine voltages on the outputs 12 and 13 to appear as shown in FIG. 2, line A, which are summed as shown in line B of FIG. 2. While the supply frequency $E_R$ to the synchro system is not represented herein, let it be assumed that it crosses the zero voltage line at 270°, as shown in line B of FIG. 2, to establish a "start" pulse which is produced by the amplifier and limiter 20 to assure that the inputs to the counter are not amplitude sensitive and to establish the zero crossover with greater precision. The amplifier-limiter 17 establishes the "stop" crossover point precisely as shown in line B of FIG. 2. The counter 23 will run until stopped by this positive going crossover point of $E \theta$. Maximum count for the time period is $T=1/f$ which will determine the resolution. A full count from the counter 23 will represent that $\theta = 360°$ while zero count will represent $\theta = 0°$. The binary count in between will be linearly related and represent a straight binary readout.

While an error may be involved due to the phase shifter, this error will occur at the binary counter 23 since the period will change with frequency. A 1 percent error in total readout frequency count causes a 1 percent error in a total angle readout of the counter 23. At 360° this would mean a 3.6° error unless the counter speed is made a function of line frequency, as shown in FIG. 1.

FIG. 3

Figure 3:
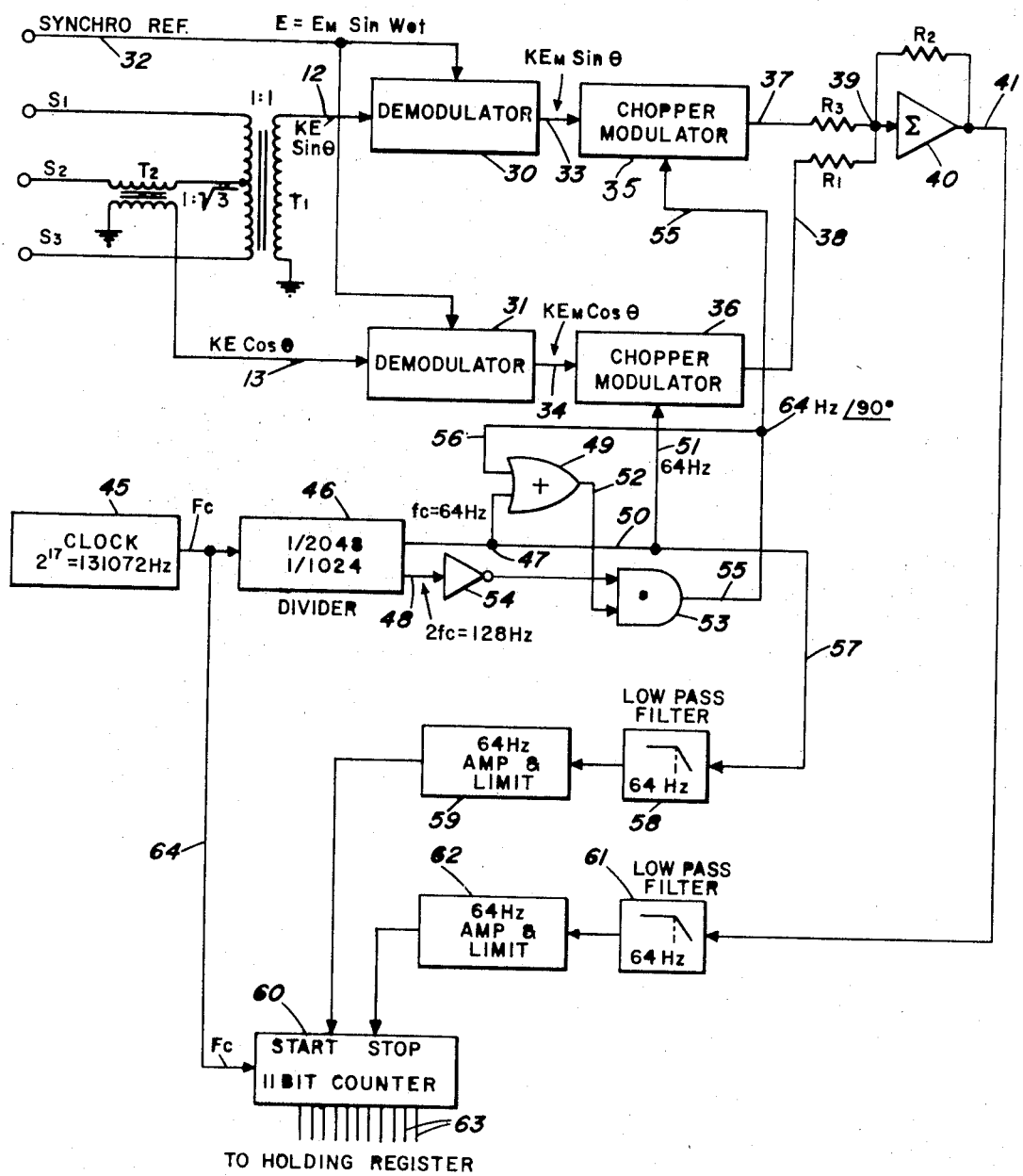
FIG. 3 is a block circuit schematic diagram of a synchro-to-digital converter modification operating independently of the synchro reference frequency.

Referring now more particularly to FIG. 3, there is shown another embodiment of the synchro-to-digital converter of FIG. 1 which will obtain the angle $\theta$ and make it insensitive to line frequency. In this embodiment the three synchro inputs S1, S2, and S3 are applied to a Scott transformer in the same manner as in FIG. 1 producing $KE \sin \theta$ on the output 12 and $KE \cos \theta$ on the output 13. The output 12 is coupled to a demodulator 30 while the output 13 is coupled to a demodulator 31. Each demodulator is synchronized by the synchro reference voltage herein shown to be ($E=E_M \sin \omega t$). The output 33 of demodulator 30 will have a voltage signal $KE_M \sin \theta$ and the output 34 of the demodulator 31 will have the voltage output $KE_M \cos \theta$. The output 33 is coupled to a chopper modulator 35 and the output 34 is coupled to a chopper modulator 36, the outputs 37 and 38, respectively, being coupled through resistors $R_3$ and $R_1$ to a terminal 39 constituting the input to a summing amplifier 40. The output terminal 41 of the summing amplifier 40 is returned to the input through a feedback resistor $R_2$ to the terminal 39.

In this embodiment a clock source 45 generates a frequency of 131,072 Hz. which is divided in a divider circuit 46 by 2,048 to produce a clock frequency, $fc$, of 64 Hz. on the output conductor 47. The divider 46 also divides the clock frequency by 1,024 to produce the clock frequency, $2fc$, or 128 Hz. on the output 48. The output 47 of 64 Hz. is applied as one input to an OR-circuit 49 and by branch conductors 50 and 51 as the chopper frequency input to the chopper modulator 36. An output 52 from OR-circuit 49 is coupled as one input to an AND-circuit 53, the second input to this AND-circuit 53 being the $2fc$ frequency on the output 48 through an inverter 54 to apply a 128-Hz. input to AND-circuit 53. The two inputs from 52 and 54 to the AND-circuit 53 produce a 64-Hz. output signal at 90° on the output 55 which is applied through one branch conductor 56 as the second input to the OR-circuit 49 and through the conductor 55 as the chopper modulator frequency to the chopper modulator 35. The output 50 from the divider circuit 46 producing the frequency, $fc$, is also coupled by a branch circuit 57 through a low-pass filter 58 and a limiter and amplifier circuit 59 to the "start" terminal of a binary counter 60, herein shown to be an 11-bit counter although other bits more or less may be used to suit the particular needs. The output 41 from the summing amplifier 40 is coupled through a low-pass filter 61 and an amplifier and limiter circuit 62 to the "stop" terminal of the binary counter 60. The outputs 63 from the binary counter may be coupled to any desirable indicator or to a holding register, as illustrated in FIG. 3. By using an external clock source such as 45 herein and divided down to a usable frequency, $fc$—64 Hz. in this example, the clock frequency becomes a reference frequency. The 90° phase shift is obtained from the divide AND and OR circuits so that two signals 90° out-of-phase are obtained; that is, the frequency $fc$=64 Hz. applied by way of conductors 50 and 51 to the chopper modulator 36 to chopper modulate the voltage $KE_M \cos \theta$ is 90° out-of-phase with the 64 Hz. chopper frequency applied by conductor 55 to the chopper modulator 35 modulating the voltage $KE_M \sin \theta$. These two 90° phase related chopper signals modulate the envelopes of $KE_M \sin \theta$ and $KE_M \cos \theta$ so that they may be added in the summing amplifier 40. The summed output from the summing amplifier 40 is put through the low-pass filter 61 to remove the harmonics of $fc$. The now established reference frequency $F_c$ is applied directly from the clock source 45 over the conductor means 64 to the binary counter 60 to be counted between the "start" and "stop" signals applied from the outputs of the amplifier and limiter circuits 59 and 62. The output $fc$ from the divide circuit 46 is filtered in the low-pass filter 58 to obtain the same phase shift due to filtering of the summed signal in the low-pass filter 61. Note that at this point amplitude matching of filter response is not critical but phase matching is. Both signals are amplified and clipped to obtain precise zero crossing as discussed and for the same purpose as shown and described for that of FIG. 1 except the amplifier herein is a band-pass type to better filter the harmonics of $fc$. The principal advantages of this embodiment over the embodiment of FIG. 1 are that the line frequency variations have no effect on accuracy, the changes in clock frequency do not affect accuracy if the filters track in phase over the frequency excursion, and higher clock speeds or lower $fc$ can lead to a greater number of bits and greater resolution with little change in circuitry.

Another means of implementation is to convert the angle $\theta$ to a proportional direct current voltage. The direct current voltage can then be converted to a digital number using a linear analog-to-digital converter. Since a direct current voltage implies filtering, the time response to changes in angle $\theta$ by this means would be slow in comparison to the embodiment shown in FIGS. 1 and 3.

While many modifications may be provided on the basis of the teachings of two embodiments in FIGS. 1 and 3 it is to be understood that I desire to be limited in the spirit of my invention only by the scope of the appended claims.

I claim:

1. A synchro-to-digital converter comprising:
   a synchro system having a source voltage and transmission leads of three line phases at voltage amplitudes establishing the synchro rotor angular position;
   a Scott transformer coupled to said synchro leads to produce sine and cosine voltage outputs of amplitudes establishing synchro rotor position;
   a phase shifter coupled to the two voltage outputs of said Scott transformer to produce two signals from the two voltage outputs of said Scott transformer out of phase;
   a summing means coupled to said phase shifter to receive said two phase shifted sine and cosine signals to sum the same on an output thereof producing a voltage representative of the synchro rotor position at that instant;
   a binary counter of frequency pulses coupled to the output of said summing means to stop binary count with each summed voltage at the rising zero voltage crossover point; and
   a reference voltage applied to said binary counter to start the counting at a rising zero voltage crossover point of said reference voltage whereby a binary count will accumulate up to the angular position of said synchro rotor from a predetermined angular reference rotor position.

2. A synchro-to-digital converter as set forth in claim 1 wherein
   said phase shifter is a resistance-capacitance network to produce signal currents in quadrature,
   said reference voltage couples the synchro source voltage to said binary counter to start said count; and
   said two signals are current signals in quadrature.

3. A synchro-to-digital converter as set forth in claim 2 wherein
   said coupling of said synchro source voltage and said output of said summing means each include an amplifier and limiter means to limit the voltage amplitude to accurately fix zero voltage crossover points.

4. A synchro-to-digital converter as set forth in claim 1 wherein
   said phase shifter includes a demodulator and chopper modulator in each sine and cosine voltage output coupling to said summing amplifier, and
   said reference voltage is a clock source coupled to said chopper modulators through AND and OR gates to chopper modulate said demodulated sine and cosine voltages in quadrature.

5. A synchro-to-digital converter as set forth in claim 4 wherein
   said clock source is of high frequency and a frequency divider is coupled to the output of said clock source to reduce said high frequency to low frequency.

6. A synchro-to-digital converter as set forth in claim 5 wherein said coupling of clock source to said binary counter is by two branch conductors, one branch conductor to provide clock pulses to be counted and another branch being through said divider and having amplifier and limiter means therein to provide distinct crossover voltage points to start said binary counter in the counting operation, and amplifier and limiter means in coupling from said summing amplifier to provide distinct rising voltage crossover points for stopping said counter.

* * * * *

UNITED STATES PATENT OFFICE
CERTIFICATE OF CORRECTION

Patent No. 3,636,554            Dated 1-18-72

Inventor(s) WILLIAM N. FARNETH

UNDER RULE 322

It is certified that error appears in the above-identified patent and that said Letters Patent are hereby corrected as shown below:

Column 2, lines 16 and 17 that portion of the sentence

"The output 13 conducts"

should read

"The output 12 produces the voltage function $E\sin\theta$ while the output 13 conducts"

Column 2, line 29

"to the output 1 which summed"

should read

"to the output 16 which summed"

Column 2, line 32

"phasor voltage $E_7\theta$ that is shifted"

should read

"phasor voltage $E\angle\theta$ that is shifted"

Column 2, line 38

"phasor voltage $E_7\theta$ is applied through"

should read

"phasor voltage $E\angle\theta$ is applied through"

Patent No. 3,636,554 dated 1-18-72

Inventor: WILLIAM N. FARNETH (CONTINUED)

- 2 -

Column 2, line 66

"crossover point of E θ."

should read

"crossover point of E$\angle$θ."

Signed and sealed this 27th day of June 1972.

(SEAL)
Attest:

EDWARD M. FLETCHER, JR.
Attesting Officer

ROBERT GOTTSCHALK
Commissioner of Patents